United States Patent
Hao et al.

(10) Patent No.: US 8,054,760 B2
(45) Date of Patent: Nov. 8, 2011

(54) LINE-RATE, REAL-TIME-TRAFFIC DETECTOR

(75) Inventors: Fang Hao, Morganville, NJ (US); Murali Kodialam, Marlboro, NJ (US); Tirunell V. Lakshman, Morganville, NJ (US)

(73) Assignee: Alcatel Lucent, Paris (FR)

( * ) Notice: Subject to any disclaimer, the term of this patent is extended or adjusted under 35 U.S.C. 154(b) by 92 days.

(21) Appl. No.: 12/543,529

(22) Filed: Aug. 19, 2009

(65) Prior Publication Data
US 2011/0044201 A1 Feb. 24, 2011

(51) Int. Cl.
*G01R 31/08* (2006.01)
(52) U.S. Cl. ...................................... 370/252
(58) Field of Classification Search .......... 370/230, 370/235, 252, 253, 254, 352, 329, 330, 389, 370/392, 493–395
See application file for complete search history.

(56) References Cited

U.S. PATENT DOCUMENTS

| 6,594,268 B1 * | 7/2003 | Aukia et al. ........... 370/400 |
| 2001/0026546 A1 * | 10/2001 | Schieder et al. ........ 370/338 |
| 2003/0016627 A1 * | 1/2003 | MeLampy et al. ....... 370/235 |

OTHER PUBLICATIONS

"Revealing Skype Traffic: When Randomness Plays With You," by Dario Bonfiglio, et al, SIGCOMM'07, Aug. 27-31, 2007, Kyoto, Japan, 12 pages.

\* cited by examiner

*Primary Examiner* — Kwang B Yao
*Assistant Examiner* — Tung Q Tran
(74) *Attorney, Agent, or Firm* — Mendelsohn, Drucker & Associates, P.C.; Steve Mendelsohn

(57) ABSTRACT

A line-rate, real-time-traffic detector classifies a network traffic flow as real-time when it determines the smoothness of the packet arrival rate of the network traffic flow is bounded by an empirically derived bound. In some embodiments, to improve performance, a tighter smoothness bound is applied to the smoothness calculations performed on a first set of packet arrival times, while a looser smoothness bound is applied to a second set of packet arrival times, the second set inclusive of and larger than the first.

19 Claims, 3 Drawing Sheets

U.S. 8,054,760 B2

LINE-RATE, REAL-TIME-TRAFFIC DETECTOR

BACKGROUND

1. Field of the Invention

The present invention relates to communication and computer networks, and, in particular, to line-rate detection of real-time traffic.

2. Description of the Related Art

This section introduces aspects that may help facilitate a better understanding of the invention(s). Accordingly, the statements of this section are to be read in this light and are not to be understood as admissions about what is or is not in the prior art.

Network traffic classification is an important part of network quality-of-service (QoS) management. For example, in many cases, it is useful to identify which flows in a network belong to time-sensitive, real-time multimedia applications (e.g., streaming video, audio, or voice traffic) and which flows belong to non-time-sensitive, non-real-time applications (e.g., email). This information may then be used, for example, to selectively throttle non-time-sensitive flows to maintain QoS for time-sensitive flows.

With the recent increasing volume of time-sensitive traffic on the Internet, including voice-over-IP (VoIP) and Internet-protocol television (IPTV), network service providers and operators are demanding tools to effectively detect and manage such traffic in their networks. However, many applications that are responsible for such traffic are not easy to detect using conventional approaches that depend on well-known port association, packet header and payload inspections, and related methods. This is because these applications may use random port assignments and data encryption to defeat such detection methods. For example, it is well known that the VoIP application, Skype, a product of Skype Technologies S.A, Luxembourg, employs many carefully designed schemes to avoid detection and get around firewalls. In addition, packet inspection methods require line-rate processing and considerable memory, both of which are very costly.

As a result, extensive research has recently been directed to alternative methods for traffic classification and traffic-type identification based on statistics of traffic flow. Moore and Zuev, for example, have proposed a machine-learning approach based on Bayesian analysis to perform off-line classification of Internet traffic into categories such as peer-to-peer, multimedia, and webpage accesses. More information can be found in Andrew W. Moore, Denis Zuev, "Internet traffic classification using Bayesian analysis techniques," *ACM SIGMETRICS* 2005, which has been incorporated herein by reference in its entirety. Other approaches have been proposed as well. A survey of traffic-classification techniques based on machine learning is given in Thuy T. T. Nguyen, Grenville Armitage, "A survey of techniques for Internet traffic classification using machine learning," *IEEE Communications Surveys and Tutorials*, 2008, also incorporated herein by reference in its entirety.

In general, these machine-learning techniques are based on analysis of a subset of flow parameters that are assumed to vary between traffic types and can thus be used to differentiate the types. These machine-learning techniques are good for rough estimates of traffic type but usually have relatively poor accuracy overall. Skype, for example, has received much attention in recent years because it employs sophisticated mechanisms to conceal its traffic and avoid detection by machine-learning methods. Many studies have been done to analyze the running behavior and traffic patterns of Skype based on measurements and reverse engineering. More information can be found in S. A., Baset, H. Schulzrinne, "An analysis of the Skype peer-to-peer Internet telephony protocol," *IEEE Infocom* '06, Barcelona, Spain, April 2006; P. Biondi, F. Desclaux, "Silver Needle in the Skype," *Black Hat Europe* '06, Amsterdam, the Netherlands, March 2006; S. Guha, N. Daswani and R. Jain, "An experimental study of the Skype peer-to-peer VoIP system," *5th Intl. Workshop on Peer-to-Peer Systems*, Santa Barbara, Calif., February 2006; and Dario Bonfiglio, Marco Mellia, Michela Meo, Nicolo Riticca, Dario Rossi, "Tracking down Skype traffic," *IEEE/ACM INFOCOM* 2008, each of which is incorporated by reference herein in its entirety.

Work has also been performed on detecting Skype traffic based on monitoring packets on network links. More information on this work can be found in K. Suh, D. R. Figuieredo, J. Kurose, D. Towsley, "Characterizing and detecting relayed traffic: A case study using Skype," *IEEE Infocom* '06, Barcelona, Spain, April 2006 ("Suh et al."), and Dario Bonfiglio, Marco Mellia, Michela Meo, Dario Rossi, Paolo Tofanelli, "Revealing skype traffic: when randomness plays with you," *ACM SIGCOMM* 2007 ("Bonfiglio et al."), each of which is incorporated by reference herein in its entirety.

For example, Suh et al. focuses on detection of relayed Skype traffic, while, in Dario et al., detection is based on characteristics of inter-packet gap, packet size, and randomness in payload. This latter method has been shown to work well for picking out Skype VoIP flows from the traces that were studied. However, inter-packet gap is not a good metric to differentiate real-time vs. non-real-time traffic in general. This is mainly because there is strong correlation between consecutive inter-packet gaps. As a result, flows with similar mean and variance of inter-packet gaps may be inherently very different, and yet mistakenly be judged to be the same. In addition, inter-packet gap analysis requires the maintenance of a fairly large state memory for each flow. This is primarily because statistical testing is done for all possible packet sizes. Skype may also use more than six different CODECs, each of which may have many different combinations of frame sizes and bit rates, and each packet may use any one of four "redundant factors." As a result, the inter-gap algorithm may end up tracking hundreds of different packet sizes, using considerable resources, and taking long periods of time to classify flows. Finally, a pitfall of tracking packet size is that certain Skype calls may go through one or more super-node relay nodes, which may change packet sizes, making the packet sizes even harder to track.

Thus, it would be beneficial to have techniques for identifying real-time traffic flows, which techniques (a) are less computationally and memory intensive than existing techniques, (b) may be used to detect real-time flows in seconds, and (c) are not dependent on packet size.

SUMMARY

Thus, in one embodiment, the present invention is a machine-implemented method for classifying a traffic flow in a network, the method including the steps of (a) determining a first smoothness value for a specified first number of packets of the traffic flow, (b) comparing the first smoothness value to a specified first smoothness bound, and (c) classifying the traffic flow as a real-time traffic flow based on the comparison of step (b).

In another embodiment, the present invention is an apparatus for classifying a traffic flow in a network, the apparatus including (a) means for determining a first smoothness value for a specified first number of packets of the traffic flow, (b)

means for comparing the first smoothness value to a specified first smoothness bound, and (c) means for classifying the traffic flow as a real-time traffic flow based on the comparison of means (b).

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
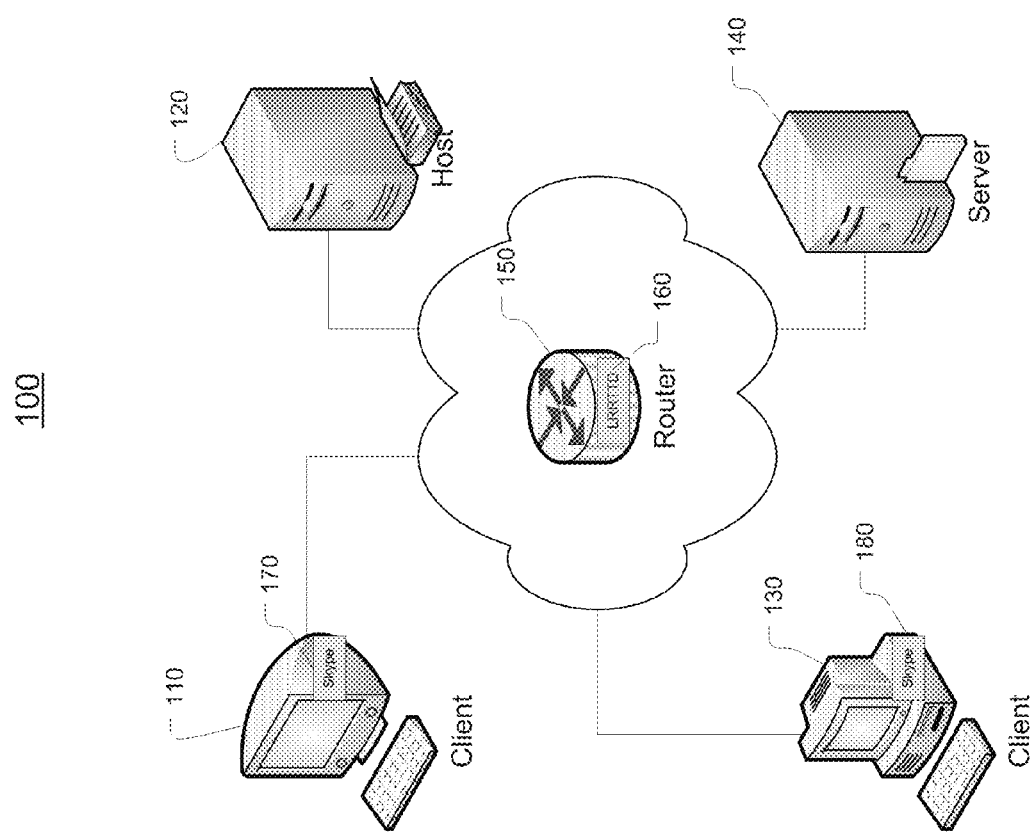
FIG. 1 is a block diagram of an exemplary communication network incorporating a line-rate, real-time-traffic (LRRTT) detector according to various embodiments of the present invention.

FIG. 1 illustrates exemplary communications network 100 according to various embodiments of the present invention. Communications network 100 includes client computer 110, host computer 120, client computer 130, server computer 140, and router 150. Data communications between any two or more computers in network 100 are generally routed through or visible to router 150 and are generally visible to the other computers in the network as well.

In exemplary network 100, router 150 hosts line-rate, real-time-traffic (LRRTT) detector 160, and client computers 110 and 130 host real-time applications, in this case, Skype applications 170 and 180, respectively. Note that LRRTT detector 160 could alternatively and equally well be hosted by one of the other network computing devices in network 100, e.g., server computer 140. Also note that LRRTT detector 160 may be implemented in various ways, including as an application running on a network computing device, as dedicated circuitry, or as a combination of both, as would be understood by one skilled in the art.

In operation, users of Skype applications 170 and 180 may be communicating with each other using network 100. This data communication is thus typically visible to other computing devices on the network such as router 150 and, consequently, to LRRTT detector 160.

Data generated by real-time applications such as Skype have particular characteristics that differentiate the data from data generated by non-real-time applications. In particular, given a reasonable limitation to buffer depth and delay, to avoid audio/video synchronization issues, audible dropouts in real-time streaming audio and/or VOIP applications, and visible artifacts in real-time video streaming and/or video-conferencing applications, the packet arrival rate needs to be constant or nearly constant. The CODECs associated with these real-time applications typically generate packets at a constant rate. However, network congestion, routing, statistical dropout, and other factors tend to impose variable delays in the transport of packets and a variance in the inter-packet arrival rate. Fortunately, however, in the timeframe of detection associated with an LRRTT detector of the present invention, which is on the order of seconds, this variance is generally very small. Note that the present invention focuses on the "smoothness" of the packet arrival times of a flow, while the prior art focuses on the variance of packet inter-arrival gaps of a flow.

Smoothness

The line-rate real-time-traffic detector of the present invention is based on a new "$\theta$-bound" metric that characterizes the "smoothness" of the packet-arrival timing of a network-traffic flow. A flow is smooth if it behaves like a constant-rate packet flow. The $\theta$-bound metric indicates how much a flow deviates from a constant-rate packet flow. Compared to the inter-packet gap, the $\theta$-bound metric better reflects the behavior of such real-time traffic.

The $\theta$-bound metric is based on packet timing and not bit rate. Although it is possible to define a similar metric for bit rate, packet timing appears more relevant for real-time network-traffic flows. For example, for VoIP flows, CODECs generate packets every few milliseconds, but, due to the use of compression, bit rate and correspondingly packet size may vary.

As a result, an advantage of the LRRTT detector of the present invention is that it does not require statistical testing for all possible packet sizes or inspection of packet payloads. It is thus fast and inexpensive to operate. Additionally, most real-time network-traffic flows can be detected within one or two seconds with the present invention, while worst-case detection times are on the order of approximately ten seconds.

A constant-rate network traffic packet flow is one where the packets in the flow are sent out by the source at fixed intervals. Even though the packets are sent out at the source at a constant rate, by the time they reach the measurement point, relative delays of packets in the network distort the flow. Assuming the network delays are bounded, the flow distortion should likewise be bounded.

This assumption about the bound of network distortion is reasonable for two reasons. The first is that the typical lifetime of a flow is small compared to the time scale associated with large changes in network conditions (e.g., from a failed switch or router), and the detection time is also short (on the order of seconds) relative to the timescale of network changes (on the order of minutes or hours). Another way of saying this is that the statistics of the flow are stationary in the timeframe of observation or detection. It is not assumed that the delays associated with packets in the network are constant, but rather just that the variance of the delays is bounded. The second reason the bound on network distortion is reasonable is that VoIP and other real-time applications fail to work well if delay jitter is large. As a result, designing networks in a way that maintains low jitter is (implicitly or explicitly) part of the QoS agreements that exist between a service provider and its customers.

Different methods for bounding the changes in network delay may be used in the present invention, as would be appreciated by one skilled in the art. In one embodiment of the present invention, it is assumed that the variance of the network delay suffered by the packets in the flow is upper bounded by a constant. Other embodiments may provide a variable upper bound on the variance, the variable being a function of various network parameters.

In either case, given the assumption that delay jitter is bounded, the question of interest becomes whether the input is a constant-rate source. Consider a flow that originates at a source and is transmitted through the network to an observation point. We assume that all packets from the flow follow the same path through the network and that packets are processed in a first-in first-out (FIFO) manner. As a result, packets arrive at the destination in the same sequence that they are transmitted at the source. The sequence of packets for the flow generated at the source is called the input stream, and the sequence of packets arriving at the observation point is called the output stream. While transiting through the network, each packet suffers delays at the different network elements that are a function of the state of the network when the packet is processed. One objective of an LRRTT detector is to infer whether the input stream has constant or near-constant rate based on such observation of the output stream.

It is well known that the variance V(X) of a set of numbers, $X=(x_1, x_2, \ldots, x_n)$ can be represented by the equation:

$$V(X) = \frac{1}{n}\sum_{i=1}^{n} x_i^2 - \frac{1}{n^2}\left(\sum_{i=1}^{n} x_i\right)^2$$

It can be shown that the variance of a set of numbers is equal to zero if the numbers are all equal to the same constant.

Further, if $X=(x_1, x_2, \ldots, x_n)$ is the set of arrival times for a network traffic packet flow, it can be shown that if X represents an ideal constant-rate packet flow with an inter-packet gap of $\alpha$, the difference sequence $\Delta X=(x_1-\alpha, x_2-2\alpha, x_3-3\alpha, \ldots, x_n-n\alpha)$ will also have a variance of zero.

In practice, however, even if the packet source is a constant-rate source, there will be relative delays introduced, packet-to-packet, by the packetizer and network jitter, as previously discussed. The set of packet inter-arrival times $\Delta X$ will thus not be constant, and consequently, the variance $V(\Delta X)$ will not be zero.

Figure 2:
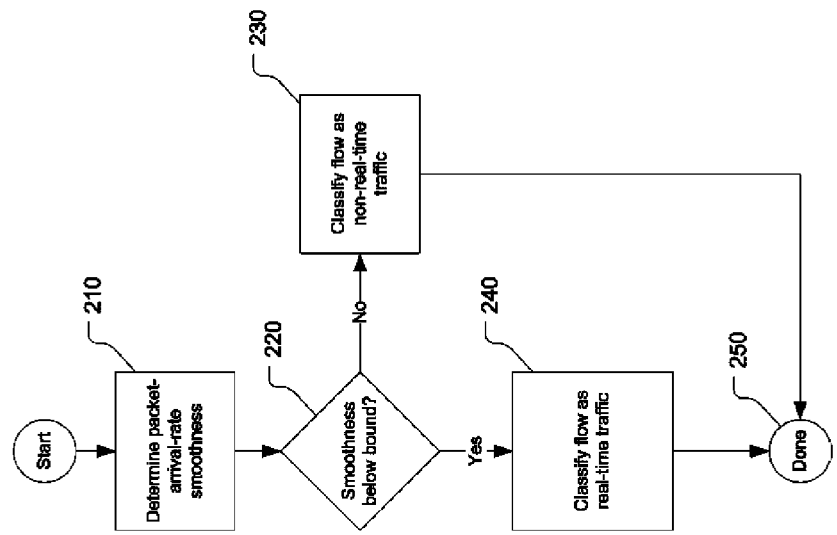
FIG. 2 is an exemplary LRRTT detector flow diagram according to various embodiments of the present invention.

The "smoothness" description suggests a representation of the invention as illustrated by exemplary LRRTT detector flow diagram 200 of FIG. 2. In step 210 of FIG. 2, the smoothness of the packet arrival rate for a network traffic flow is calculated.

For example, given a vector X representing a sequence of packet arrival times for a flow, $X=(x_1, x_2, \ldots, x_n)$ and $\alpha \geq 0$, unless X represents the arrival times of an ideal constant rate packet flow, the $\alpha$-smoothness $S(\alpha,X)$ of the vector X, defined as:

$$S(\alpha, X) = \frac{1}{n}\sum_{i=1}^{n}(x_i - i\alpha)^2 - \frac{1}{n^2}\left(\sum_{i=1}^{n} x_i - \sum_{i=1}^{n} i\alpha\right)^2$$

will be non-zero.

The $\alpha$-smoothness measures the deviation of a stream from a constant rate stream with inter-arrival time of $\alpha$. Given an n-vector X, let $X(k)=(x_1, x_2, \ldots x_k)$ denote a vector with the same first k components as X. The vector is $\theta$-bounded if there exists an $\alpha \geq 0$ such that $$S(\alpha,X(k)) \leq \theta$$

for all k=1, 2, ..., n.

Note that a constant rate stream is 0-bounded. $\theta$-boundedness insures that the points in the time series are close to a constant rate stream for small values of $\theta$.

$S(\alpha,X(k))$ can be minimized by differentiating it with respect to $\alpha$ and equating to zero. The resulting $\alpha_{min}$ corresponding to the minimum $\alpha$-smoothness can then be substituted into the equation for $S(\alpha,X(k))$ to eliminate $\alpha$, resulting in the following minimum smoothness equation:

$$S(X(k)) = \frac{3[(k+1)m_1(k) - 2f_{1(k)}]^2}{k^2 - 1} + \Delta(k)$$

where:

$$m_1(k) = \frac{\sum_{j=1}^{k} x_j}{k}$$

$$m_2(k) = \frac{\sum_{j=1}^{k} x_j^2}{k}$$

$$f_1(k) = \frac{\sum_{j=1}^{k} jx_j}{k}$$

$$\Delta(k) = m_2(k) - m_1^2(k)$$

where $m_2(k)$ and $m_2(k)$ are the first and second moments of X(k), and $\Delta(k)$ is the variance of X. S(X(k)) may be updated for each new packet arrival instance k.

Next, in step 220, the smoothness value is compared to a smoothness bound, e.g., the $\theta$-bound. If the flow's smoothness value is below the smoothness bound, then, in step 240, the flow is classified as real-time traffic. If, on the other hand, the flow's smoothness value is determined to be above the smoothness bound, then, in step 230, the flow is classified as non-real-time traffic. In either case, following classification, the process ends in step 250.

Practical Detection

The basic idea behind detection is to search for a sequence of packets in a flow such that its smoothness is bounded by:

$$(\sqrt{\theta}+\sqrt{V(D)})^2$$

As can be seen, there are two parts to this bound. The first part $\theta$ relates to the packet jitter from the source. The sending host may distort the packet timing and thus affect $\theta$ and the lower bound of the jitter. For example, the network stack or a CODEC that does not operate at a strictly constant bit rate (CBR) may insert jitter into the transport.

The second part V(D) is the variance of the network delay, which varies according to network conditions and length of the period during which sampling is done.

Figure 3:
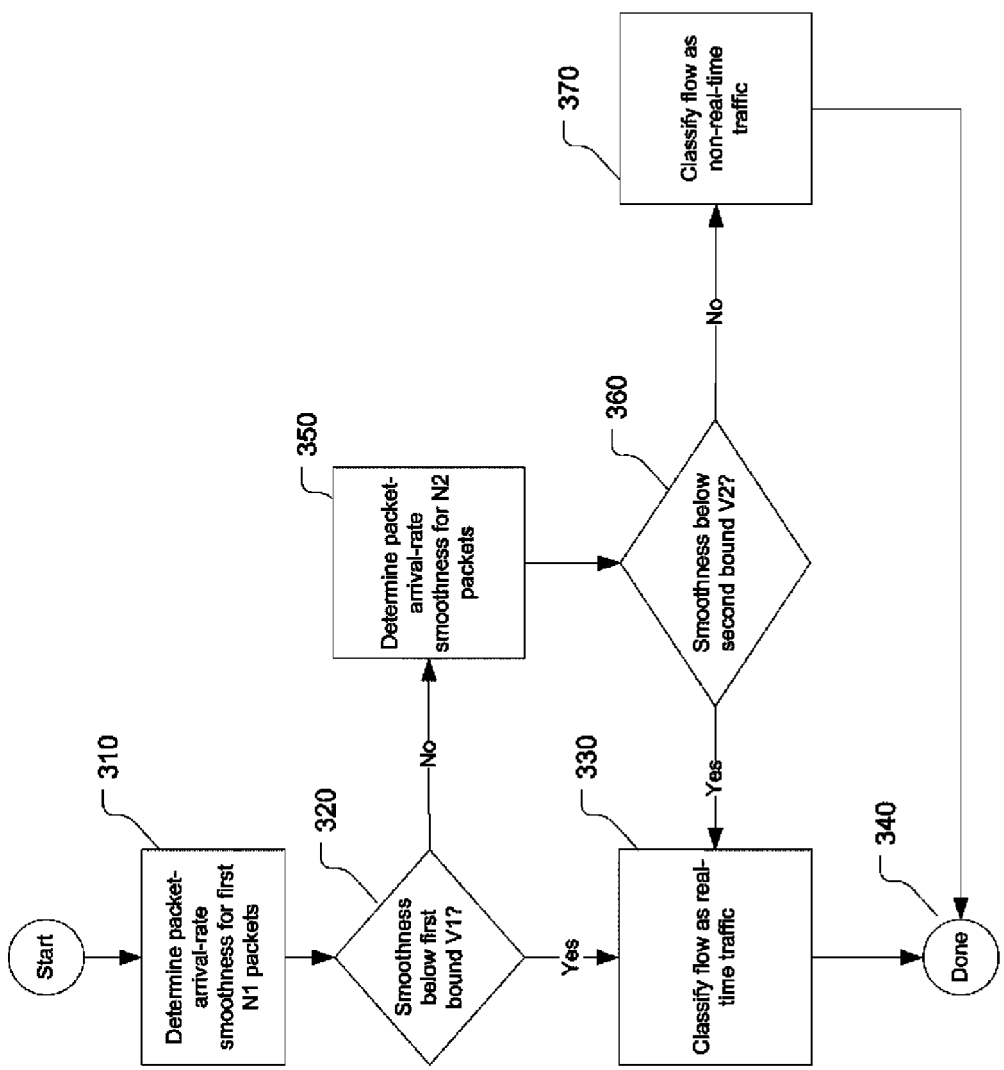
FIG. 3 is another exemplary LRRTT detector flow diagram according to various embodiments of the present invention.

To help reduce detection time, in practice, the detection is done in two phases. The first phase involves a lower, first bound V1 associated with a first set of packet-arrival-time samples N1, and the second phase involves a higher, second bound V2 (V2>V1) associated with a larger set of samples N2 that includes the first set of samples. In an alternative implementation, the second set of samples does not include the first set of samples. Such bounds are arrived at empirically by analyzing real-time and non-real-time network-traffic flows in actual systems. In operation, the first N1 samples are tested against the stricter smoothness bound V1 to see if they fit within that bound. If they do not, then the detector continues to accumulate samples until N2 samples have been collected. The larger set of samples is then tested against the less-stringent smoothness bound V2. If either answer is yes, then the flow is marked as real time; otherwise, it is marked as non-real time. This process is illustrated by exemplary LRRTT detector process flow 300 of FIG. 3.

In step 310, the packet-arrival-rate smoothness value is calculated for the first N1 packets. In step 320, the smoothness value is compared with a first smoothness upper bound V1. If, in step 320, the packet-arrival-rate smoothness value is determined to be below the first bound V1, then, in step 330, the flow is classified as a real-time traffic flow, and the process ends in step 340. However, if, in step 320, the packet-arrival-rate smoothness value of the flow is determined to be above first bound V1, then, in step 350, a calculation is performed on N2 packets, where the N2 packets include the first N1 packets and additional packets such that N2>N1. If, in step 360, it is determined that the arrival-rate smoothness of these N2 packets is below the second bound V2 (V2>V1), then, in step 330, the flow is classified as real-time traffic. Otherwise, if, in step 360, it is determined that the arrival-rate smoothness of these N2 packets is above the second bound V2, then, in step 370, the flow is classified as non-real-time traffic. In either case, the process completes in step 340.

Investigations of trace data have shown that the beginning of a multimedia flow often appears less like a constant-rate flow than does the body of the flow. This is mainly due to the initial signaling that occurs during connection setup. Since the length of such signaling periods varies across flows, in some embodiments, the detection process may be implemented to reset itself if an initial sequence exceeds the bound, and the total number of packets is less than Nmax, where Nmax>N2>N1.

The values for N1, N2, V1, V2, and Nmax are determined empirically. For Skype traffic, some typical values may include Nmax=200, V1=4, N1=50, V2=400, N2=100.

Note that, although the present invention has been described in the context of embodiments in which real-time traffic flows are indicated by smoothness values that are less than a specified smoothness bound, the present invention can also be implemented in the context of embodiments in which real-time traffic flows are indicated by values that are greater than a specified bound. For example, real-time traffic flows could be indicated by values that are (i) equal to the reciprocal of the described smoothness values and (ii) greater than a bound equal to the reciprocal of the described smoothness bound.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention.

The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Alternatively or additionally, the invention or parts of the invention can be implemented in various forms, including without limitation, an application specific integrated circuit (ASIC) or field programmable gate array (FPGA).

All of the aforementioned embodiments, whether processor, processor with software, ASIC, FPGA, stand-alone logic, or electronic or optical circuit should be understood herein to fall within the scope of the claims terminology of a "machine," and "machine-implemented" should be understood to include, without limitation, any of the aforementioned implementations as well as other implementation technologies that would be understood to be equivalent to those technologies by one skilled in the art.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

In general, the present invention should not be limited by the examples of the embodiments but retain the full scope of the claims recited below as would be understood to one skilled in the art.

We claim:

1. A machine-implemented method for classifying a traffic flow in a network, the method comprising:
   (a) determining a first smoothness value for a specified first number of packets of the traffic flow;
   (b) comparing the first smoothness value to a specified first smoothness bound;
   (c) classifying the traffic flow as a real-time traffic flow based on the comparison of step (b);
   (d) determining a second smoothness value for a specified second number of packets of the traffic flow, if the first smoothness value is above the first smoothness bound;
   (e) comparing the second smoothness value to a specified second smoothness bound; and
   (f) classifying the traffic flow as a real-time traffic flow, if the second smoothness value is below the second smoothness bound; and
   (g) classifying the traffic flow as a non-real-time traffic flow, if the second smoothness value is above the second smoothness bound.

2. The invention of claim 1, wherein the second number of packets is greater than the first number of packets.

3. The invention of claim 1, wherein the second smoothness bound is greater than the first smoothness bound.

4. The invention of claim 1, wherein packets of the second number of packets include the packets of the first number of packets.

5. The invention of claim 1, wherein:
the second number of packets is greater than the first number of packets;
the second smoothness bound is greater than the first smoothness bound; and
the first smoothness value and the second smoothness value are generated based on packet arrival times.

6. The invention of claim 1, wherein the first smoothness value is generated based on packet arrival times.

7. The invention of claim 1, wherein determining the first smoothness value comprises computing the variance of the packet arrival times for at least a consecutive two packet arrival times of the specified first number of packets of the traffic flow.

8. The invention of claim 1, wherein determining the first smoothness value comprises computing the first and second moments of the packet arrival times for at least a consecutive two packet arrival times of the specified first number of packets of the traffic flow.

9. The invention of claim 1, wherein determining the first smoothness value comprises updating a smoothness equation derived by optimizing a value for a packet inter-arrival gap $\alpha$ such that a variance of a difference sequence of arrival times of the packets of the traffic flow is minimized, wherein the arrival times of the packets of the traffic flow are represented by $X=(x_1, x_2, \ldots, x_n)$, where n is a positive integer representing the number of packets in the flow and the difference sequence is $\Delta X=(x_1-\alpha, x_2-2\alpha, x_3-3\alpha, \ldots, x_n-n\alpha)$.

10. Apparatus for classifying a traffic flow in a network, the apparatus comprising a network interface that receives packets from the network, a processor and memory that process the packets, compute values, compare values, and report results, the apparatus further:
(a) computes a first smoothness value for a specified first number of packets of the traffic flow;
(b) compares the first smoothness value to a specified first smoothness bound; and
(c) reports that the traffic flow is a real-time traffic flow based on the comparison;
(d) determines a second smoothness value for a specified second number of packets of the traffic flow, if the first smoothness value is above the first smoothness bound;
(e) compares the second smoothness value to a specified second smoothness bound; and
(f) classifies the traffic flow as a real-time traffic flow, if the second smoothness value is below the second smoothness bound; and
(g) classifies the traffic flow as a non-real-time traffic flow, if the second smoothness value is above the second smoothness bound.

11. Apparatus for classifying a traffic flow in a network, the apparatus comprising:
(a) means for determining a first smoothness value for a specified first number of packets of the traffic flow;
(b) means for comparing the first smoothness value to a specified first smoothness bound;
(c) means for classifying the traffic flow as a real-time traffic flow based on the comparison of means (b);
(d) means for determining a second smoothness value for a specified second number of packets of the traffic flow, if the first smoothness value is above the first smoothness bound;
(e) means for comparing the second smoothness value to a specified second smoothness bound; and
(f) means for classifying the traffic flow as a real-time traffic flow, if the second smoothness value is below the second smoothness bound; and
(g) means for classifying the traffic flow as a non-real-time traffic flow, if the second smoothness is above the second smoothness bound.

12. The invention of claim 11, wherein the second number of packets is greater than the first number of packets.

13. The invention of claim 11, wherein the second smoothness bound is greater than the first smoothness bound.

14. The invention of claim 11, wherein packets of the second number of packets include the packets of the first number of packets.

15. The invention of claim 11, wherein:
the second number of packets is greater than the first number of packets;
the second smoothness bound is greater than the first smoothness bound; and
the first smoothness value and the second smoothness value are generated based on packet arrival times.

16. The invention of claim 11, wherein the first smoothness value is generated based on packet arrival times.

17. The invention of claim 11, wherein determining the first smoothness value comprises computing the variance of the packet arrival times for at least a consecutive two packet arrival times of the specified first number of packets of the traffic flow.

18. The invention of claim 11, wherein determining the first smoothness value comprises computing the first and second moments of the packet arrival times for at least a consecutive two packet arrival times of the specified first number of packets of the traffic flow.

19. A machine-implemented method for classifying a traffic flow in a network, the method comprising:
(a) determining a first smoothness value for a specified first number of packets of the traffic flow;
(b) comparing the first smoothness value to a specified first smoothness bound; and
(c) classifying the traffic flow as a real-time traffic flow based on the comparison of step (b), wherein determining the first smoothness value comprises updating a smoothness equation derived by optimizing a value for a packet inter-arrival gap a such that a variance of a difference sequence of arrival times of the packets of the traffic flow is minimized, wherein the arrival times of the packets of the traffic flow are represented by $X=(x_1, x_2, \ldots, x_n)$, where n is a positive integer representing the number of packets in the flow and the difference sequence is $\Delta X=(x_1-\alpha, x_2-2\alpha, x_3-3\alpha, \ldots, x_n-n\alpha)$.

* * * * *